(12) United States Patent
Valerio

(10) Patent No.: US 10,993,414 B2
(45) Date of Patent: *May 4, 2021

(54) PET WASH COLLAR

(71) Applicant: Benjamin Valerio, Ranchero Cordova, CA (US)

(72) Inventor: Benjamin Valerio, Ranchero Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,833

(22) Filed: May 24, 2019

(65) Prior Publication Data

US 2019/0327935 A1    Oct. 31, 2019

Related U.S. Application Data

(63) Continuation-in-part of application No. 14/756,717, filed on Oct. 1, 2015, now Pat. No. 10,349,628.

(60) Provisional application No. 62/071,924, filed on Oct. 6, 2014.

(51) Int. Cl.
*A01K 13/00* (2006.01)
*A01K 27/00* (2006.01)

(52) U.S. Cl.
CPC .......... *A01K 13/001* (2013.01); *A01K 27/007* (2013.01)

(58) Field of Classification Search
CPC ..................... A01K 13/001; A01K 27/007
See application file for complete search history.

(56) References Cited

U.S. PATENT DOCUMENTS

| | | | |
|---|---|---|---|
| 531,303 A * | 12/1894 | Christopher | A01K 13/001 |
| | | | 119/665 |
| 538,521 A * | 4/1895 | Kelly | A47K 3/287 |
| | | | 4/618 |
| 2,161,047 A | 6/1939 | Holden | |
| 2,630,559 A | 4/1958 | McMurray | |
| 3,749,064 A | 7/1973 | Weinstein | |
| 3,811,413 A | 5/1974 | Scherpenborg | |
| 4,782,792 A | 11/1988 | Anthony | |
| 5,445,113 A | 8/1995 | Hostetler | |
| 6,827,039 B1 | 12/2004 | Nelson | |
| 7,182,043 B1 | 2/2007 | Nelson | |
| 8,555,819 B1 | 10/2013 | McFarland | |
| 10,349,628 B2 * | 7/2019 | Valerio | A01K 13/001 |
| 2004/0046045 A1 | 3/2004 | Alexander | |
| 2005/0000466 A1 | 1/2005 | Falkenberg | |
| 2005/0217601 A1 | 10/2005 | Judge | |
| 2006/0174842 A1 | 8/2006 | Bond | |

(Continued)

FOREIGN PATENT DOCUMENTS

| | | |
|---|---|---|
| EP | 2876544 | 12/2013 |
| JP | 2003204729 | 7/2003 |
| JP | 2004290139 | 10/2004 |

*Primary Examiner* — Jessica B Wong
(74) *Attorney, Agent, or Firm* — G. Turner Moller

(57) ABSTRACT

A pet washing collar includes a flexible permeable hose for placement around the neck of a pet. A hose coupling delivers water into the interior of the hose which distributes water around part of the neck of the pet. In some embodiments, the flexible permeable hose includes inner and outer tubes. A length adjuster allows lengthening and shortening of the collar to accommodate pets of different size. A buckle connects ends of the collar together to allow it to be placed and removed from a pet. The effective water distributing length of the hose is adjustable by selectively pinching off part of the hose.

20 Claims, 2 Drawing Sheets

(56) References Cited

U.S. PATENT DOCUMENTS

| | | |
|---|---|---|
| 2007/0289548 A1 | 12/2007 | Smool |
| 2008/0115739 A1 | 5/2008 | Clenny |
| 2009/0101077 A1 | 4/2009 | Shaham |
| 2009/0224069 A1 | 9/2009 | Lin |
| 2016/0255809 A1 | 9/2016 | Dowd |

* cited by examiner

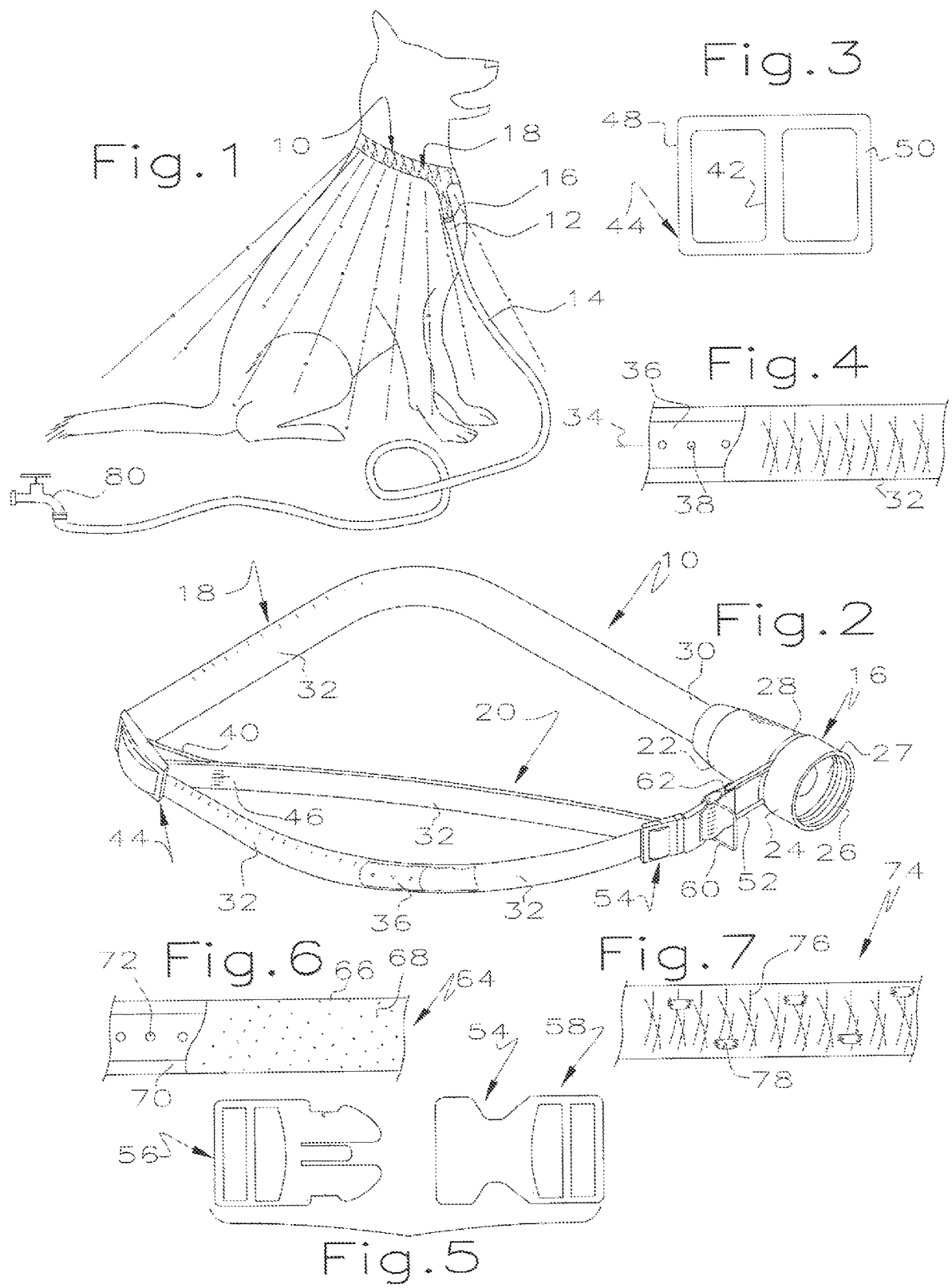

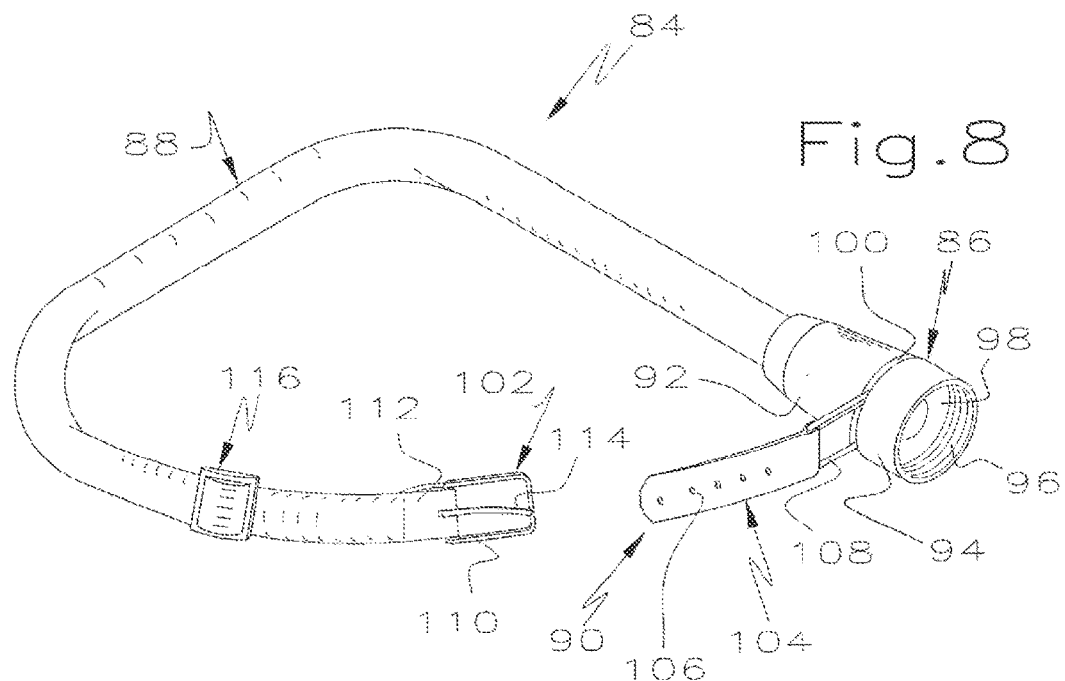
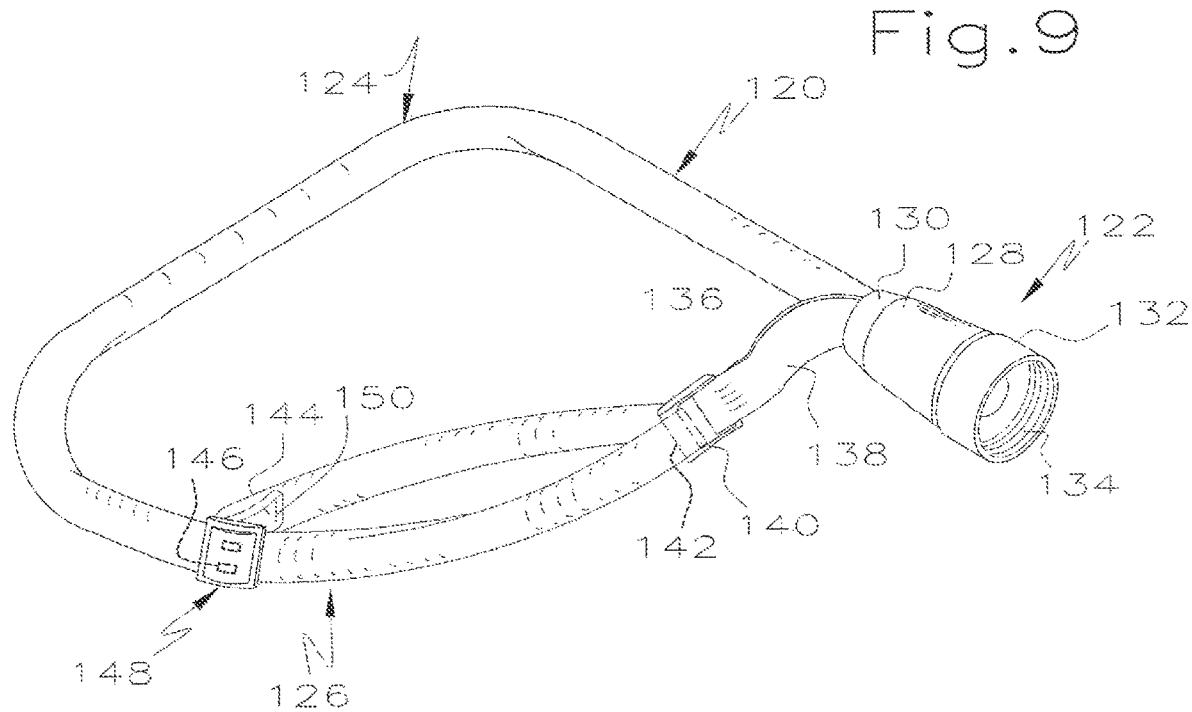

PET WASH COLLAR

This application is based on Provisional Application Ser. No. 62/071,924 filed Oct. 6, 2014, the disclosure of which is incorporated herein by reference and the priority of which is hereby claimed. This application is a continuation-in-part of application Ser. No. 14/756,717 filed Oct. 1, 2015, now U.S. Pat. No. 10,349,628, issued Jul. 16, 2019.

This invention relates to a collar that may be placed around the neck of a pet to deliver water when washing the pet.

BACKGROUND OF THE INVENTION

Washing a pet, such as a dog, can be an awkward affair when done indoors or outdoors for a variety of reasons. A lease or similar restraint may be needed to control the animal. There is some difficulty delivering water to the desired location on the animal along with soap or other chemicals. In essence, a person does not have enough hands to do all of the chores needed.

Some disclosures of interest relative to this invention are found in U.S. Pat. Nos. 538,521; 2,161,047; 3,749,064; 4,782,792; 6,827,039; 6,948,451; 7,182,043; 8,555,819; Japan Patents 2003204-729 and 2004290139 and United States Printed Patent Applications 20050000466, 20050217601, 20060174842, 20070289548 and 20090101077.

SUMMARY OF THE INVENTION

As disclosed herein, a collar is secured around the neck of the pet and may include a flexible permeable hose to distribute water along much or all of the length of the collar so water is delivered around the neck of the pet. The collar includes a hose coupling to which may be attached a hose for delivering water to the collar. In one embodiment, the flexible permeable hose may include an outer tube of permeable material and an inner tube of impermeable material through which perforations have been made. In other embodiments, the flexible permeable hose may include a single tube of permeable material through which water exits. The collar may be of adjustable length to accommodate pets of different size and includes a latch or connection securing ends of the collar together.

BRIEF DESCRIPTION OF THE DRAWINGS

FIG. 1 is a pictorial view of a pet with a pet washing collar delivering a water spray on to the pet;

FIG. 2 is a pictorial view of the pet washing collar of FIG. 1, certain parts being broken away for clarity of illustration, illustrating many of the features thereof;

FIG. 3 is a front view of a buckle used in the collar of FIG. 2;

FIG. 4 is an enlarged broken view of one embodiment of a flexible permeable hose;

FIG. 5 is an exploded view of one type of connector used to releasably secure opposite ends of the collar together;

FIG. 6 is an enlarged broken view of another embodiment of a flexible permeable hose;

FIG. 7 is an enlarged broken view of another embodiment of a flexible permeable hose;

FIG. 8 is a pictorial view of another embodiment of a pet washing collar; and

FIG. 9 is an exploded pictorial view of another embodiment of a pet washing collar.

DETAILED DESCRIPTION OF THE INVENTION

Referring to FIG. 1-4, the concept is to place a collar 10 around a pet's neck, such as a dog's neck, attach a threaded hose end 12 of a garden or other hose 14 to a female hose coupling 16 on the collar 10 and turn on the water. This produces a substantial water flow or spray onto the animal which can then be soaped followed by a rinse by water passing through the same collar 10. In the alternative, a soap container (not shown) may be inserted between the hose 14 and the coupling 16 to discharge an amount of soap onto the animal. The pet wash collar 10 accordingly comprises, as major components, the hose coupling 16, a flexible permeable hose 18 and an adjustable tensile element 20 securing the collar 10 into a circular or round configuration capable of surrounding the neck of a pet. The collar 10 may be designed for outdoor use in which event the hose coupling 16 may be a garden hose coupling.

The hose coupling 16 may be attached to the hose 18 adjacent one end thereof and include a tubular segment 22 affixed to the hose 18 and a female connector 24 having standard coarse garden hose threads 26 therein and a conventional seal 27 to prevent water leakage. The connector 24 may preferably be rotatable on the end of the segment 22 to allow the connector 24 to be easily secured to the hose end 12 as is well known in the art. The coupling 16 may be of metal, plastic or any other suitable material. The coupling may provide a groove or slot 28 near the junction of the connector 24 and segment 22 for purposes more fully apparent hereinafter. The coupling 16 accordingly delivers water into the interior of the hose 18. The collar 10 may be designed for use in bathrooms, kitchens, garages or the like where tubs, showers, sinks and wash basins are available. In such event, the hose coupling 16 may be of any other suitable type, typically having finer threads.

The bodily flexible permeable hose 18 provides one end 30 captivated to the hose coupling 16 in any suitable manner, such as by crimping, gluing or otherwise attaching the end 30 in the segment 22. The hose 18 includes an outer tubular member 32 which may be made of a permeable material, i.e. having a very large number of passageways extending laterally of a long axis 34 of the hose 18, thereby delivering water in the manner of a conventional soaker hose. The outer member 32 may preferably include water flow passages around 360° of the circumference of the hose perpendicular to the axis 34 to insure water being applied to the pet rather than the possibility of all water being directed away from the pet.

The hose 18 may also include an inner tubular member 36 made of an impermeable member, such as an organic polymer film of polypropylene, polyethylene terephylate, polyethylene or the like, having a series of fewer but relatively larger openings 38 providing a liquid flow path between the hose coupling 16 and the interior of the outer member 32. In the embodiment of FIG. 4, the outer tubular member 32 may be a woven fabric in which the fabric thread is an impermeable material but providing a very large number of passages between the adjacent threads. It will be seen that the inner member 36 is a technique for distributing water throughout the effective water distributing length of the outer member 32.

The flexible permeable hose 18 acts much like a conventional garden soaker hose but has a greater flow capacity, e.g. 5-20 times the flow capacity of a conventional soaker hose. Typically, the flow capacity of the hose 18 is in the range of ¼-1 gallons/minute per foot of hose 18 whereas a conventional soaker hose has a much lower flow capacity, i.e. normally on the order of about 0.05 gallons/minute per foot of soaker hose.

In the embodiment of FIG. 2, the outer member 32 may be used as part of the adjustable tensile member 20. Specifically, the outer member 32 may extend from the end 30 to an opposite end 40 attached to a central strut 42 of a buckle 44, as by stitching 46. It will be seen that the stitching 46 may close off the end 40 of the hose. An intermediate portion of the hose 18 may pass under the end struts 48, 50 of the buckle 44 and over the central strut 42 in a conventional manner so the buckle 44 acts as a length adjuster of a section of the hose 18 which, in turn, acts as a tensile element connecting the buckle 44 to the other end of the collar 10.

One end of the length adjuster 20 accordingly may be attached to the end of the collar 10 corresponding to the first hose end 30 or hose coupling 16. This may be accomplished by a clip 52 having a circular end received in the groove 28 of the hose coupling 16 so the length adjuster 20 stays in place while the female connector 24 is free to rotate.

An advantage of this arrangement is the effective water distributing length of the hose 18 is adjusted by positioning the buckle 44 because the thickness of the inner and outer tubular members 32, 34 passing over the outer member 32 and the central strut 42 pinches off water flow in the inner member 34. This allows water flow upstream of the buckle 44 and restricts or prevents water movement downstream of the buckle 44 and accordingly adjusts the water distributing length of the hose 18 as a function of the position of the buckle 44. This has the advantage of increasing the water distributing length of the hose 18 as a function of washing a larger pet. It will accordingly be seen that the inner member 36 may terminate short of the end 40 of the outer tubular member 32 as shown in the broken part of FIG. 2 and, more specifically, may terminate before the halfway mark of the tensile element 20. It will be seen that the length adjuster 20 may accordingly be a part of the hose 18 or may be a separate member. Similarly, the free ends of the collar 10 may be connected by the tensile element 20 to provide a circular or round device to fit over the neck of a pet to be washed.

The length of the water distributing length of the collar 14 may be less than 360° around the pet's neck and may be substantially less. The water distributing length of the collar 10 may be on the order of 25-80% of the overall length of the collar 10 and may preferably lie be the range of half to three quarters of the overall length of the collar 10, meaning that the part of the collar 10 under the pet's neck may not deliver water. This allows a water spray on the pet and avoids wasting a large amount of water on the pet's front feet and on the user's feet.

In order to easily remove the collar 10 from a pet, a connector 54 may be provided to separate one end of the collar 10 from the other. The connector 54 may be of any suitable type, such as an adjustable belt analogous to a man's trouser belt or the like but is illustrated in FIG. 5 as a conventional side release buckle having a male end 56 releasably latched into a female end 58. It will be seen the connector 54 allows easy attachment and removal of the collar 10 from a pet. It will be seen that the tensile element 20 of the length adjuster and the mechanism connecting opposite ends of the collar 10 may be the same, as in the case of an adjustable trouser belt. It will also be seen that the tensile element 20 of the length adjuster may incorporate the mechanism 54 releasably connecting opposite ends of the collar 10 together, as in the embodiment of FIG. 2.

In order to control a pet, it may be desirable to have an attachment such as a ring 60 to which a leash (not shown) may be applied. The ring 60 may be placed at any convenient location on the collar 10, such as at the junction of a fabric strap 62 which connects one of the connector ends 56, 58 to the clip 52. In the alternative, the user may control the pet by stepping on the garden hose 14.

The hose 18 may be of any suitable type and is illustrated in several embodiments in FIGS. 4, 6 and 7. In FIG. 6, the hose 64 includes an outer permeable tube or member 66 which may be of conventional soaker hose material comprising impermeable rubber particles fused together to provide a very large number of pores or passages 66 therethrough, the passages 66 basically being so small as to be imperceptible to the human eye. As in the embodiment of FIG. 4, the inner member 68 may be an impermeable organic polymer film having much fewer but relatively larger openings 70 therethrough. This is basically the same construction as conventional soaker hoses.

In FIG. 7, a flexible permeable hose 74 may include a woven fabric tube 76 having a very large number of small passages between adjacent threads and a series of larger openings 78 woven into the fabric of the tube 76 acting to control the overall distribution of water flow from the pet washing collar, meaning that the openings 78 may or may not be regularly spaced along the length of the tube 76.

The collar 10 may be equipped with a soap compartment (not shown) at any location on the collar 10 such as adjacent the garden hose connection 12. A quantity of soap placed in the compartment may be automatically dispersed through the hose 18 in much the same manner that solid fertilizer is distributed through a similar chamber in conventional tree feeding assemblies. In addition or in the alternative, a flow control valve (not shown) may be provided on or near the female hose coupling 16 in order to regulate water flow through the hose 18.

Use of the pet washing collar 10 should now be apparent. The collar 10 is attached around the pet's neck and latched with the connection 54. The male garden hose connection 12 is attached to the coupling 16. By stepping on the garden hose 14 or providing a leash for the leash ring 60, the collar 10 acts as a restraint on the pet leaving all hands free to apply soap, operate a spigot 34 or otherwise wash the pet. After spraying the pet with a suitable amount of water, water flow may be stopped and soap applied, either through the soap dispenser (not shown) or directly from a container. After suitable scrubbing of the pet, the pet may be rinsed by again manipulating the spigot 80 or a separate valve (not shown) attached between the hose coupling 16 and the hose end 12. When finished, the collar 10 may be removed by unlatching the connection 54.

Referring to FIG. 8, a pet washing collar 84 comprises, as major components, a hose coupling 86, a flexible permeable hose 88, and connectors 90 changing the collar 84 from an open loop into a closed loop capable of surrounding and being supported on the neck of a pet.

The hose coupling 86 may be attached to the hose 88 adjacent one end thereof or may be attached intermediate the ends of the hose 88. The hose coupling 86 may include a tubular segment 92 affixed to the hose 88 and a female connection 94 having standard coarse garden hose threads 96 therein and a conventional seal 98 to prevent water leakage. The connection 94 may preferably be rotatable on the end of the segment 92 to allow the connection 94 to be easily secured to the hose end 12 as is well known in the art. The coupling 86 may be of metal, plastic or any other suitable material. The coupling 86 may provide a groove or slot 100 near the junction of the connection 94 and segment 92 for purposes more fully apparent hereinafter. The coupling 86 accordingly delivers water into the interior of the hose 18. The collar 84 may be designed for use in bathrooms, kitchens, garages or the like where tubs, showers, sinks and wash basins are available. In such event, the hose coupling 86 may be of any other suitable type, typically having finer threads.

The flexible permeable hose 88 may be a woven fabric, a soaker hose material or any other suitable flexible material having passages providing communication between an interior and exterior of the hose 88. Some of the passages may direct water inwardly toward the neck of the pet and some of the passages may direct water outwardly away from the pet's neck. In some of the embodiments, the permeable hose 88 may include an inner conduit analogous to FIGS. 4 and 6. In other embodiment, the inner conduit may be eliminated. The connectors 90 may be of any suitable type. FIG. 8 illustrates a belt buckle 102 and a belt end 104 having a series of adjustment holes 106. The belt end 104 may connect to a clip 108 received in the groove 100. The belt buckle 102 may be of conventional construction including a frame 110 pivotally received in a loop provided by a strap 112 sewn or otherwise secured to an end of the flexible permeable hose 88. The strap 112 may be a doubled over end of the hose 88. The belt buckle 102 also may include a pivotally mounted prong 114 to fit in any of the openings 106 and thereby adjust the effective length of the connector 90 and thereby adjust the length of the collar 84 or the loop provided by the collar 84. The connectors 90 illustrate that the function of adjusting the length of the loop of the collar 84 may be accomplished by the same device that functions to uncouple the loop ends provided by the belt buckle 102 and the belt end 104 so the collar 84 may readily be placed around the neck of the pet.

The collar 84 may be equipped with a buckle 116 similar to the buckle 44 shown in FIG. 3 that may be adjusted along the length of the hose 88 and thereby adjusts a length of water distribution of the hose 88.

Referring to FIG. 9, there is illustrated another pet washing collar 120 comprising, as major components, a hose coupling 122, a flexible permeable hose 124 and a length adjuster 126 placing the collar 120 into a loop capable of surrounding the neck of a pet.

The hose coupling 122 may be attached to one end of the hose 124 or to a location intermediate the ends of the hose 124. The hose coupling 122 may include a fitting 128 to which the hose 124 is affixed, such as by crimping a sleeve 130 or the like, and a female connection 132 having standard coarse garden hose threads 134 therein and a conventional seal (not shown) to prevent water leakage. The connection 132 may preferably be rotatable on the end of the fitting 128 to allow the connection 132 to be easily threaded onto the hose end 12 as is well known in the art. The coupling 122 may be of metal, plastic or any other suitable material. The coupling 122 accordingly delivers water into the interior of the hose 124. The collar 120 may be designed for use in bathrooms, kitchens, garages or the like where tubs, showers, sinks and wash basins are available. In such event, the hose coupling 122 may be of any other suitable type, typically having finer threads. to here The length adjuster 126 may include a loop segment 136 made of flexible permeable hose or a strap 138 having a fixture 140 providing bars 142. One end of the strap 138 may be captivated to the fitting 128 by the crimpable sleeve 130. Another end of the strap 130 may be looped over one of the bars 142 and stitched to secure the fixture 140 to the strap 138. An end 144 of the hose 124 may be looped through the fixture 140 and looped over a bar 146 of an adjustable buckle 148. Stitching 150 may secure the hose end 144 to the bar 146 in a conventional manner. The buckle 148 may be similar to the buckle 44 in FIG. 3 and accordingly provides a length adjuster of the looped hose 124. It will be seen that the length adjuster 126 provides sufficient adjustment to enlarge the loop of the collar 10 sufficiently to pass over the head of a pet and thereby eliminate the need for a pair of releasable connectors to provide this function.

It will be seen that movement of the buckle 148 along the hose 124 acts to adjust the length of the loop of the collar 120 and also adjusts a length of water distribution of the hose 124. This is accomplished because the buckle 148 stops or substantially restricts water delivery downstream of the buckle 148.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the claims.

I claim:

1. A pet washing collar comprising
   a loop configured to enclose a periphery of an inside volume receiving a neck of a pet and configured to surround and be supported on the neck of the pet;
   the loop including a flexible permeable hose having passages from an interior of the flexible permeable hose to an exterior of the flexible permeable hose, the passages in the flexible permeable hose being configured to deliver water from the hose exterior in a direction away from the inside volume;
   the flexible permeable hose having a hose coupling configured to mate with a water source and deliver water to the interior of the flexible permeable hose;
   the loop including a mechanism configured to enable the loop to be placed around the neck of the pet; and
   the loop including a length adjuster configured to change the size of the loop.

2. The pet washing collar of claim 1 wherein the mechanism comprises a pair of releasable connectors including a belt buckle having a frame and a prong pivotally connected to the frame and a belt end having a series of openings therein, the prong being configured to be secured in selected ones of the openings and thereby adjust the length of the loop.

3. The pet washing collar of claim 1 wherein the mechanism comprises releasable connectors independent of the length adjuster.

4. The pet washing collar of claim 1 wherein the flexible permeable material of the hose comprises a woven fabric.

5. The pet washing collar of claim 1 wherein the hose coupling is a garden hose coupling.

6. The pet washing collar of claim 1 further comprising openings in the flexible permeable hose configured to deliver water from the hose exterior toward the inside volume.

7. The pet washing collar of claim 1 wherein the flexible permeable hose provides an axis of water movement from the hose coupling along a length of the flexible permeable hose, and further comprising openings in the flexible permeable hose configured to delivery water from the hose exterior toward the axis of water movement.

8. The pet washing collar of claim 1 further comprising a device configured to divide the flexible permeable hose into an upstream segment in communication with the hose coupling and a downstream segment, the device being configured to prevent water flow from the upstream segment into the downstream segment and thereby adjust a length of water distribution through the flexible permeable hose.

9. The pet washing collar of claim 8 wherein the device is a buckle.

10. The pet washing collar of claim 1 wherein the mechanism includes first and second releasable mating connectors, the first releasable connector being connected to a particular end of the flexible permeable hose and a second releasable connector being connected to the hose coupling.

11. The pet washing collar of claim 1 wherein the mechanism includes the length adjuster.

12. The pet washing collar of claim 1 wherein the pet includes a head and the length adjuster is configured to expand to fit over the head of the pet.

13. A pet washing collar comprising
a loop configured to enclose a periphery of an inside volume receiving a neck of a pet and configured to surround and be supported on the neck of the pet;
the loop including a flexible permeable hose having passages from an interior of the flexible permeable hose to an exterior of the flexible permeable hose, the passages in the flexible permeable hose being configured to deliver water from the hose exterior in a direction toward the inside volume;
the flexible permeable hose having a hose coupling configured to mate with a water source and deliver water to the interior of the flexible permeable hose; and
the loop including first and second releasable connectors configured to disconnect and reconnect to allow the loop to be placed around the neck of the pet, and
a length adjuster configured to change the size of the loop.

14. The pet washing collar of claim 13 wherein the first and second releasable connectors comprise
a belt buckle including a frame and a pivotally mounted prong, and
a belt end comprising a plurality of openings in the belt end, the prong being configured to be secured in selected ones of the openings and thereby adjust the length of the loop.

15. The pet washing collar of claim 13 further comprising openings in the flexible permeable hose configured to deliver water from the hose exterior away from the inside volume.

16. The pet washing collar of claim 13 wherein the flexible permeable material of the hose comprises a woven fabric.

17. The pet washing collar of claim 13 further comprising a device configured to divide the flexible permeable hose into an upstream segment in communication with the hose coupling and a downstream segment, the device being configured to prevent water flow from the upstream segment into the downstream segment and thereby adjust a length of water distribution through the flexible permeable hose.

18. A pet washing collar comprising
a loop configured to enclose a periphery of an inside volume receiving a neck of a pet and configured to surround and be supported on the neck of the pet;
the loop including a flexible permeable hose having passages from an interior of the flexible permeable hose to an exterior of the flexible permeable hose, the passages in the flexible permeable hose being configured to deliver water from the hose exterior in a direction toward the inside volume;
the flexible permeable hose having a garden hose coupling configured to mate with a water source and deliver water to the interior of the flexible permeable hose;
the loop including first and second releasable connectors configured to allow the loop to be placed around the neck of the pet; and
the loop including a length adjuster configured to change the size of the loop.

19. The pet washing collar of claim 18 further comprising a device configured to divide the flexible permeable hose into an upstream segment in communication with the hose coupling and a downstream segment, the device being configured to prevent water flow from the upstream segment into the downstream segment and thereby adjust a length of water distribution through the flexible permeable hose.

20. The pet washing collar of claim 18 wherein the flexible permeable material of the hose comprises a woven fabric.

\* \* \* \* \*